G. W. K. FISHER.
TRAP.
APPLICATION FILED DEC. 14, 1911.

1,067,909.

Patented July 22, 1913.

UNITED STATES PATENT OFFICE.

GEORGE W. K. FISHER, OF VANCOUVER, WASHINGTON.

TRAP.

1,067,909.     Specification of Letters Patent.     Patented July 22, 1913.

Application filed December 14, 1911. Serial No. 665,682. REISSUED.

*To all whom it may concern:*

Be it known that I, GEORGE W. K. FISHER, a citizen of the United States, residing in the city of Vancouver, county of Clarke, and State of Washington, have invented certain new and useful Improvements in Traps, of which the following is a specification.

My invention relates to traps and more particularly to that class of traps adapted for catching mice, rats, or other animals, bodily within a cage or housing, without injury, as distinguished from traps adapted to catch the animal by the limb or other portion of the body, as in the case of the well known steel trap.

This invention is the result of further experiments and developments of the device shown and described in my pending application, filed March 24, 1911, under Serial No. 616,599. In this invention I have overcome certain difficulties found in the device of the pending application, and have invented a trap most sensitive in its tripping mechanism, and most effective in the performance of its function of instantly throwing the animal into the cage or prison below.

The principal object of the invention, therefore, is to provide in a trap of the character referred to, an improved tripping mechanism which can be set into operation by the slightest movement of a member which has no other function than to be easily and freely moved into contact with another member for the purpose of completing an electric circuit for a current of electricity which energizes a magnet and which operates the trip.

Other improvements will appear from the following description of one embodiment of the invention, reference being had to the accompanying sheet of drawings illustrating the same and in which,—

Figure 3:
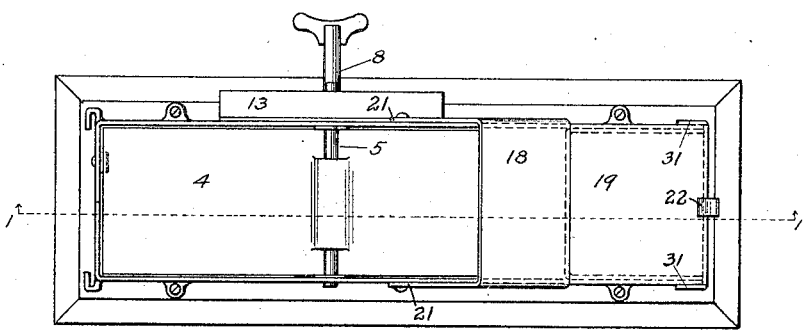
Figures 1, 2:
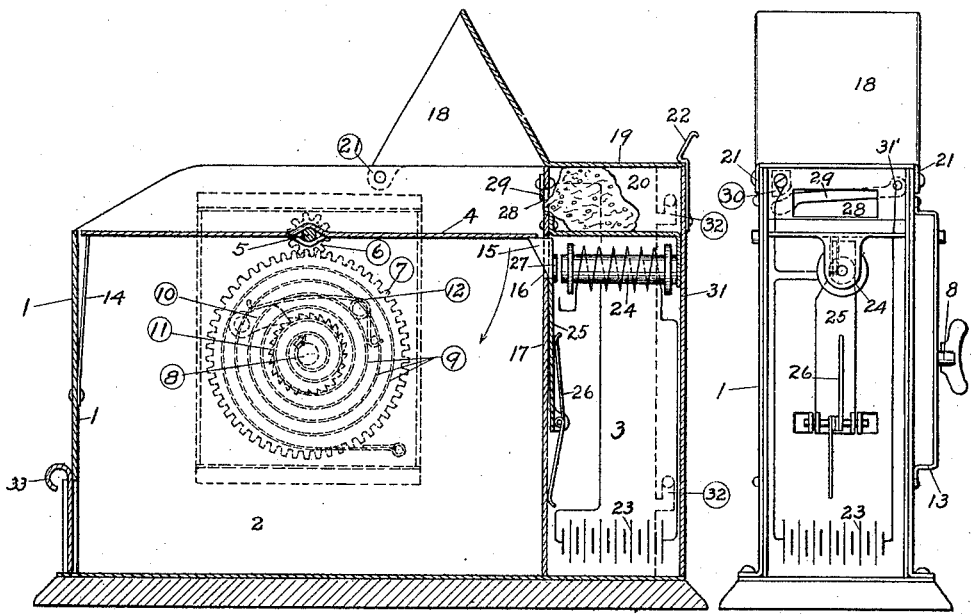

Figure 1 is a longitudinal sectional view through a trap embodying my invention, taken on line 1—1 of Fig. 3; Fig. 2 is an end view with the end wall removed; and Fig. 3 is a top plan view thereof.

Referring now to the drawings, 1 designates the case or body portion of the trap proper and shows two apartments 2 and 3. This case or body can be constructed large enough so that apartment 2 will be of sufficient capacity to serve as a holding cage or prison for the animals caught. A pivotally mounted trap door 4 covers apartment 2, said door being mounted upon a cross pin or shaft 5 carrying a small gear 6 which meshes with and is operated by a large gear 7, mounted upon a key shaft 8. Said large gear 7 is operated by a coiled spring 9 adapted to be wound by the key shaft 8 and held by means of a pawl 10 and ratchet 11, held in operating relationship with each other by means of a spring 12. Said gears 6 and 7, and the operating springs, pawl and ratchet are all contained in a small box or case 13 mounted upon the side of the main case or body 1 of the trap. A flat spring member 14 in apartment 2 operates to prevent the trap door 4 from turning in the wrong direction, while a trip lip or tongue 15, projecting through an opening 16, in the wall 17 between apartments 2 and 3, supports the opposite end of said door and holds it against turning in the direction indicated by the arrow under the operation of the coiled spring 9 until tripped.

Pivotally mounted upon the case or body 1, over the trip end of the door 4, is a hood 18 having a rearwardly projecting portion or extension 19 adapted when back to rest over a bait box 20, in the upper part of apartment 3. Said hood 18, with the extension 19, is adapted to be rocked forwardly upon its pivotal mounting 21, when released by pressing aside a spring clasp 22, whereby to uncover the bait box 20 for the purpose of supplying it with bait.

In apartment 3 I have placed a small dry battery, designated 23, and connected it with an electromagnet 24, mounted in the upper part of said apartment and in position to act upon a trip member 25, pivotally mounted upon wall 17. Said trip member 25 is normally held with the trip lip or tongue 15 projected through said wall 17 by means of a spring 26. The trip tongue or lip 15 is formed upon said trip member 25 by turning a portion thereof at an angle, as illustrated. In order to prevent said trip member from becoming magnetized and adhering to the core of the magnet, I prefer to place a brass rivet 27 in said trip member 25 immediately opposite the core of the magnet. This does not interfere with the trip member being attracted to the magnet and does prevent the trip member from clinging to the core of the magnet after the circuit is broken and the current is cut off.

Pivotally mounted across an opening 28 in the bait box 20, is a contact member 29 adapted to be raised by the slightest touch into contact with the contact piece 30. This member can be made as light as desired and it can be so mounted or balanced that the slightest touch will move it into contact with the contact piece, thus completing the circuit and setting into operation the tripping mechanism of the trap. In other forms of tripping mechanisms, it is usual to have the animal move the trip lever or tongue which supports the trap door and frequently the animal's own weight. This cannot be as sensitive because there is certain weight or friction to be overcome before the trip operates. In the device here described, the slightest touch is all that is necessary to set into operation an automatic trip operating mechanism. The circuit from the battery 23 runs to the pivotal mounting at 31' of the contact lever 29, through said lever or member 29, when in contact, to the contact piece 30, through the coil of the electromagnet 24 and back to the opposite side of the battery 23.

The operation of the device may be briefly described as follows: The coiled spring 9 is wound by means of the key shaft 8. The bait is placed in the bait box 20, as indicated. The animal smells the bait through the opening 28 under the hood 18 and comes to it upon the trap door 4. In endeavoring to get at the bait through the opening 28 it touches and lifts the contact member 29, which must move only a very slight distance into contact with the contact point at 30, thereby completing the circuit, magnetizing the core of the magnet 24, which attracts the trip member 25, and draws the trip tongue or lip 15 from under the end of the trap door 4, which is instantly thrown over a half turn under the tension of the spring 9, throwing the animal down into apartment 2. The contact lever drops to its normal position, breaking the circuit and permitting the trip member 25, under the tension of spring 26 to move to its normal position by the time the opposite end of the trap door has turned over, thereby stopping this end of the door and holding it until tripped again in the same manner. The trap is always set after each trip and will operate so long as there is any applied tension from the spring 9. This trip lever or member 29 supports nothing and has only to be moved slightly and the trick is done.

In the drawings I have shown a detachable end wall 31 with open slot and pin attaching means, as indicated in dotted lines at 32. This provides a simple means of access to apartment 3. I have also provided apartment 2 with a lift door, as 33, for the purpose of taking the animals therefrom.

I am aware that my invention can be embodied and applied in many different ways without departing from the spirit thereof, and I do not, therefore, limit the invention to the one form here shown and described for purposes of illustration, but claim broadly any application of the invention on which the hereto appended claims are readable when broadly and liberally interpreted

I claim:

1. In a trap of the character referred to, in combination, a cage, a power-operated trap door pivotally mounted thereon, a holding element normally holding said door closed, a magnet adjacent said holding element for moving the same, a source of electric current, a bait holder, and a movable contact element placed near the bait holder and adapted to be moved by the animal reaching for the bait, substantially as described.

2. In a trap of the character described, in combination, a cage, a trap door pivotally mounted to turn about a transverse axis, a spring actuating mechanism for said door, a magnet and source of electricity, a combination holding element and armature piece adapted to be attracted to said magnet for releasing said trap door, a circuit between said source of electricity and said magnet and a movable circuit maker and breaker connected therein, and a bait holder adjacent said circuit maker and on the opposite side thereof from the trap door, substantially as shown and described.

In witness whereof I have hereunto at Portland, Oregon, set my hand this 5th day of December, 1911.

GEORGE W. K. FISHER.

In presence of—
 E. T. REHFIELD,
 CORA A. MORGAN.

---

Copies of this patent may be obtained for five cents each, by addressing the "Commissioner of Patents, Washington, D. C."